INVENTOR
JOHN L. CARSWELL

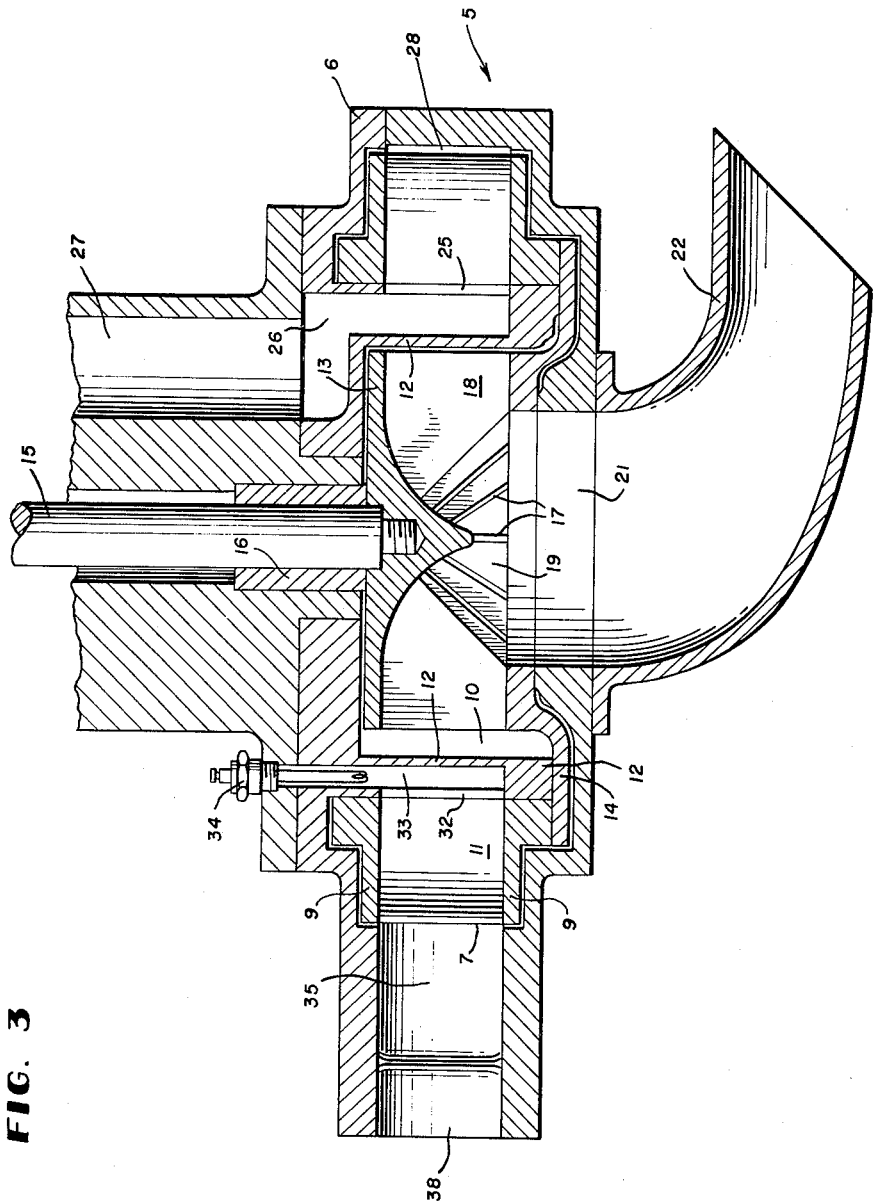

2,998,701
ROTARY INTERNAL COMBUSTION JET ENGINE
John L. Carswell, 6504 Groveland Drive,
Jacksonville 11, Fla.
Filed Sept. 6, 1960, Ser. No. 54,110
16 Claims. (Cl. 60—35.6)

This invention relates to internal combustion engines and more particularly to engines powered by internal combustion for propelling a liquid jet.

There are known to the art certain internal combustion engines which comprise a housing and a rotatable turbine impeller so constructed relative to each other that water and combustible gases may be introduced into the engine to be moved circumferentially by the impeller with the water acting as a piston during a portion of the impeller's rotation to compress the gases which are then ignited to provide the force to drive the impeller. Attempts have heretofore been made to adapt such a rotary internal combustion engine to propel a liquid jet capable of supplying power for a boat or the like. No such device within applicant's knowledge has ever proved successful.

To overcome the disadvantages of the prior art it is an object of the present invention to provide an improved rotary internal combustion engine for propelling a liquid jet.

It is another object of the invention to provide such an improved engine which is economical to construct and operate and highly effective in use.

It is still another object of the present invention to provide such a rotary engine particularly adapted for powering a boat.

It is yet another object of the present invention to provide such an engine for powering a boat wherein water for the operation of the engine is drawn from the medium through which the boat is traveling.

In general, the invention includes a rotary internal combustion engine for propelling a liquid jet which comprises a housing and a turbine impeller rotatably mounted in the housing. The impeller embodies a plurality of curved shrouded vanes defining therebetween a plurality of generally radial passages through the impeller. Inside of the vanes of the impeller is a hub which normally blocks the inside of the passages. Means are provided which define a liquid inlet port, a combustible gas inlet port, an ignition port and an exhaust gas port positioned along the path of rotation of the impeller to be connected successively with the passages as they pass the ports. The gas inlet port and the ignition port are directed toward the radially inside portion of the passages. Means are also provided to supply combustion gas through the gas inlet port. The housing has an interior configuration so as to form a neck close to the radially outer edge of the impeller between the liquid inlet and gas inlet ports. Moreover, the housing is recessed from the impeller to define a space radially outside of the passages extending circumferentially from the gas inlet port past the ignition port so that liquid introduced into the liquid inlet port is carried in said passages through said neck portion and the liquid is moved by centrifugal force into said space to permit combustion gas to be drawn out of the gas inlet port into passages radially inside of the liquid. The recess diminishes in the vicinity of the ignition port so that the liquid, which is incompressible, is moved inwardly in the passages to compress the gas trapped in the radially inner portions of the passages. Means are provided to ignite the compressed gas through the ignition port. The housing has a jet outlet extending from the combustion area so that the liquid is thrust through the jet outlet by expansion of the combustion gases. The vanes and the housing in the vicinity of the jet outlet have relative configurations such that the resultant force of the combustion drives the impeller. The exhaust port is located so that the exhaust gases are forced therethrough. Thus, the engine is in condition for the beginning of another complete cycle.

The invention having been generally described, a specific embodiment thereof will now be discussed in detail with reference to the accompanying drawings in which:

FIGURE 3 is a vertical section taken along the line 3—3 of FIGURE 2.

Figure 1:
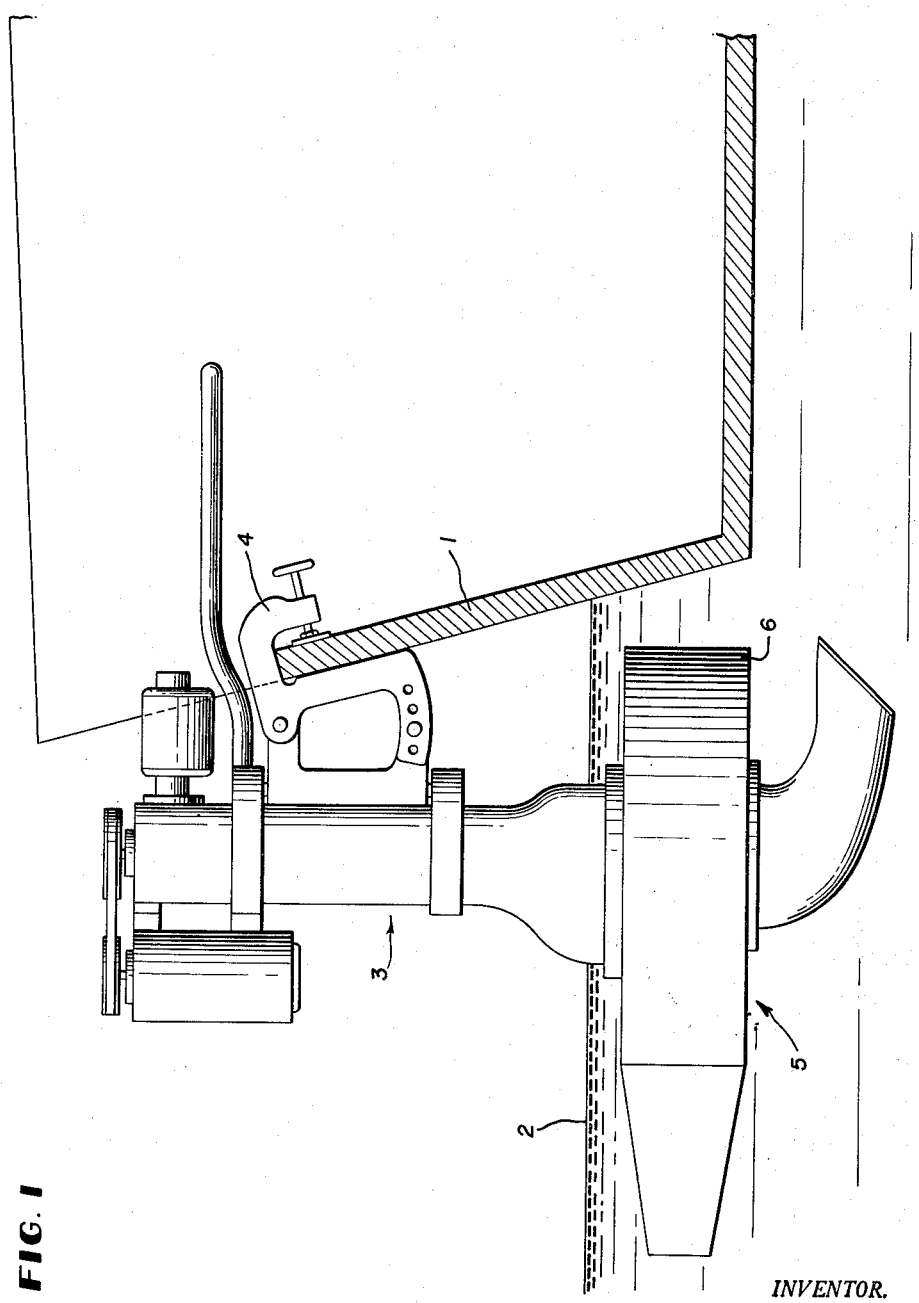
FIGURE 1 is a side elevation of an engine according to the invention embodied in an outboard motor for a boat, a portion of which is shown in section.

Depicted in FIGURE 1 is a sectional view of the stern portion of a boat 1 having a water line indicated by the dot-dash line 2. Mounted on the stern of the boat is an outboard motor 3 affixed by an appropriate clamping mechanism 4. The outboard motor 3 comprises a rotary internal combustion jet engine 5 according to the present invention. If desired the invention may be employed as an inboard boat engine.

It will be understood that the invention is not limited in its utility to boat propulsion, but may be employed in many other circumstances. Moreover, the liquid jet emitted by the apparatus of the invention may be used either to impart thrust directly to a vehicle or for any other useful purpose. For example, the jet may drive some other mechanism such as a turbine which powers a propeller.

Figure 2:
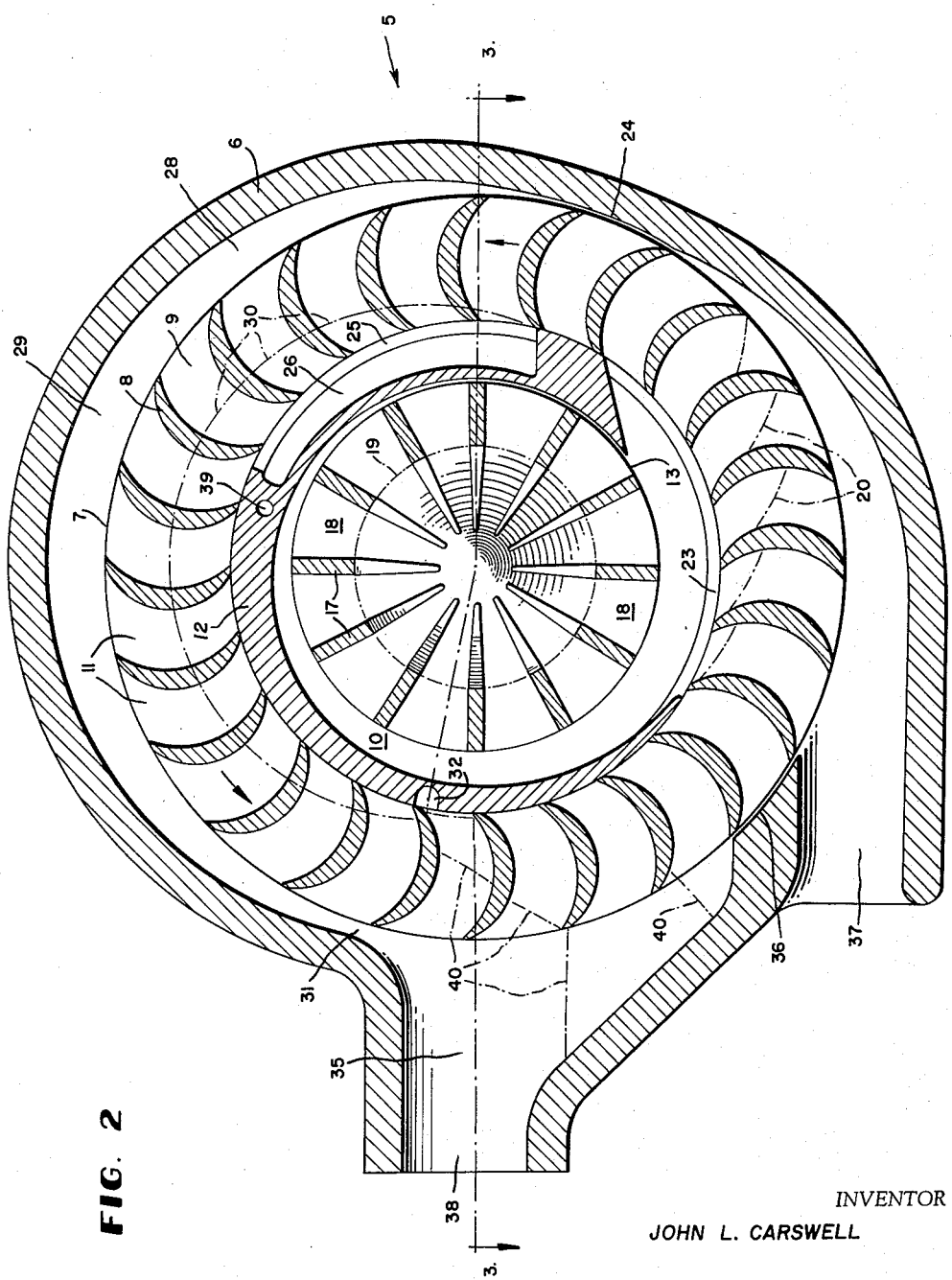
FIGURE 2 is a horizontal section of an engine according to the invention.

The rotary internal combustion engine 5 includes a housing 6 in which is rotatably mounted a turbine impeller 7 designed to rotate counterclockwise as viewed in FIGURE 2. The impeller embodies a plurality of vanes 8 which in the conventional manner are spaced circumferentially around the impeller preferably at equal intervals, the forward end of each vane being convex and the after end being concave. The sides of the vanes are shrouded by a pair of discs 9. It will be understood that in certain circumstances adequate shrouding of the vanes may be accomplished by other means than the discs 9 such as by positioning the housing walls very close to the sides of the impeller.

The vanes define therebetween a plurality of generally radial passages 11 which extend through the impeller. Mounted within the impeller is a hub 12 which is non-rotatably fixed to the housing 6 and about which the impeller 7 rotates. The hub 12 is closely embraced by the impeller so that the hub normally blocks the inside of the passages 11 as shown in FIGURE 2. The hub 12 is hollow to provide inside thereof a chamber 10 in which is mounted a centrifugal pump impeller 13. A disc 14 rigidly unites the power impeller 7 and the centrifugal pump impeller 13 in concentric relationship. As shown, the disc 14 is integral with the pump impeller 13 and is welded to the power impeller 7 but the attachment may be by other means. As shown in FIGURE 3, the disc 14 spans across the end of the hub 12. Thus the centrifugal pump 13 and the power impeller 7 form a rotary unit which is affixed to a shaft 15 which in turn extends through the side wall of the housing and is journaled in a bearing 16. Accordingly, rotation of the impeller 7 drives the pump impeller 13 and the shaft 15 from which rotary power may be taken off as desired.

The pump impeller 13 includes a plurality of radial vanes 17 which define therebetween a plurality of radial passages 18. In fluid communication with the radial passages 18 is an axial inlet 19 which communicates with an opening 21 in the housing side wall. A water scoop 22 communicates with the opening 21 and, as shown in FIGURE 1, is directed into the path of movement of the boat to obtain a supply of water for the operation of the engine.

When the centrifugal pump impeller 13 is driven, water is drawn inwardly through the scoop 22 and is forced by centrifugal action outwardly through the passages 18 into the chamber 10 within the hub 12 and then as a constant stream through a water inlet port 23 in the side wall of the hub 12 for introduction into the power impeller passages 9 moving past the water inlet port 23.

Relatively large quantities of water are required for the operation of the engine and it is desirable that the water be introduced into the impeller 7 at approximately the speed of the latter. Thus the combination of a relatively large chamber 10 and the centrifugal impeller 13 mounted therein concentric with the power impeller 7 and affixed thereto is particularly advantageous.

The water introduced into the passages 9 moves outwardly by centrifugal action as the impeller 7 rotates and is carried circumferentially along the path of movement of the impeller in the passages 9. The outer edge of the water in the passages 9 is approximately defined by the phantom lines 20 in FIGURE 2. The passages 9 are substantially filled with water by the time they pass through a neck 24 formed between the hub and the interior wall of the housing 6, which at the neck 24, extends very close to the radially outer edge of the impeller 7. Thus at the neck 24, the passages 9 are blocked at both ends to trap the water therein. Circumferentially spaced from the water inlet port 23 along the path of rotation of the impeller is a combustion gas inlet port 25 which, as shown in FIGURE 2, extends outwardly in the hub 12 from a chamber 26 which communicates with a conduit 27 extending through the housing wall. A conventional charge forming device such as a carburetor is connected to the conduit 27 to supply a combustible gas mixture such as gasoline and air, which mixture is preferably discharged as a constant stream through the gas inlet port 25.

The interior wall of the housing 6 is recessed beginning opposite the gas inlet port 25 to define a space 28 radially outside of the pasages 9 and extending circumferentially a substantial distance along the path of rotation of the impeller. As the impeller 7 rotates, a portion of the water in the passages 9 is moved by centrifugal force radially outwardly into the space 28 thereby leaving the radially inner portions of the passages 9 open. The radially inner edge of the water in the passages 9 is shown in FIGURE 2 by the phantom lines 30. Accordingly, the combustible gas mixture is drawn through the inlet 25 into the radially inner portions of the pasages 9 inside of the water.

As the impeller continues to rotate, the combustible gas is trapped between the liquid and the hub 12. The recess 28 in the housing after reaching a maximum in the area 29 progressively diminishes until a relatively narrow space is provided between the housing 6 and the impeller 7 at 31. In the hub 12 opposite the area 29 is a lubrication channel 39 with side channels (not shown) to lubricate the impeller.

As the recess diminishes the incompressible water is forced radially inwardly in the passages 9 to compress the trapped combustible gas against the hub. In the hub, opposite the narrowed portion 31 of the housing recess, is an ignition port 32 which communicates with an ignition chamber 33 in the hub in which chamber is mounted an ignition device 34 such as a spark plug, a glow plug or any other suitable means for igniting the combustible gas. As the passages 9 pass the ignition port 32, the compressed combustible gas therein is ignited thereby causing rapid expansion of the burning gas to force the liquid radially outwardly in the passages. Opposite the combustion area in the vicinity of the ignition port 32, the housing 6 is provided with a jet outlet conduit 35 through which the liquid is thrust as a continuous or substantially continuous jet. As shown in FIGURE 2, the outlet conduit 35 tapers inwardly toward its outer end and terminates in a jet nozzle 38.

An approximation of the configuration of the expanding gases in the combustion area is shown by the phantom lines 40. It is significant that by locating the ignition port 32 radially inside of the passages 9 and the jet outlet 35 radially outside of the pasages 9, the expanding combustion gases and centrifugal force combine to propel the water jet.

The configuration of the housing in the vicinity of the jet outlet and the combustion area relative to the configuration of the vanes 8 is such that, according to well known turbine theory, the resultant force of combustion drives the impeller 7.

Preferably all of the water in the passages 9 is forced outwardly through the jet outlet 35. The exhaust gases are carried in the passages 9 past a second neck 36 where the housing wall extends close to the impeller and then to an exhaust outlet 37 situated in the housing wall radially outside of the impeller in a location such that the exhaust gases are forced therethrough. The water in the water inlet port 23 entering the passages 9 assists in driving the exhaust gases through the outlet 37.

The engine may be started by any one of several means. For example, rotary power may be imparted to the shaft 15 while water and combustible gases are supplied through their inlet ports and the ignition device 34 is operated. Alternatively, a combustible gas such as a mixture of butane and air may be introduced into the ignition area while the ignition device 34 is operated to effect starting of the engine.

The operation of the engine as employed in connection with an outboard motor to power a boat will now be briefly summarized. The engine is mounted below the water line of the boat as shown in FIGURE 1 and is started by any appropriate means. As the power impeller 7 rotates, the centrifugal pump impeller 13 is driven to draw water in through the scoop 22 which water is then introduced through the water inlet port 23 to fill the passages 9. In the course of the power impeller's rotation, the water filled passages 9 are moved through the neck 24 and past the combustible gas inlet port 25. The liquid in the passages 9 is moved outwardly by centrifugal force into the space 28 and the combustible gas is drawn from the port 25 into the radially interior portions of the passages 9 to be trapped between the liquid and the hub 12. As the gas and liquid containing passages 9 approach the combustion area, the diminishing recess at 31 moves the liquid radially inwardly in the passages 9 to compress the combustible gas which is then ignited as the passages pass the ignition port 32. The resulting explosions cause the gas to rapidly expand to aid in forcing the liquid radially outwardly through the jet outlet 35. The force of combustion also provides the power for driving the impeller 7. The exhaust gases are carried in the passages 9 past the neck 36 and are forced outwardly into the exhaust outlet 37 by centrifugal force and the incoming water. The continuous jet emitted from the outlet 35 provides the necessary thrust for propelling the boat 1.

There has been illustrated and described what is considered to be a preferred embodiment of the invention. It will be understood, however, that various modifications may be made by persons skilled in the art without departing from the scope of the invention as defined by the appended claims.

I claim:

1. A rotary internal combustion engine for propelling a liquid jet which comprises a housing, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a liquid inlet port, a combustible gas inlet port, an ignition port, and an exhaust gas port positioned along the path of rotation of said impeller to communicate successively with said passages as they pass said ports, said gas inlet and ignition ports being directed toward the radially inside portion of said passages, means to supply combustion gas through said gas inlet port, said housing forming a neck close to the radially outer edge of said impeller between said liquid inlet and gas inlet ports and being recessed from said impeller to define a space radially outside of said passages extending circumferentially from said gas inlet port past said ignition port so that liquid introduced into said liquid inlet port is carried in said passages through said neck and a portion of the liquid is moved by centrifugal force into said space to permit combustion gas to egress from said gas inlet port into the passages radially inside of the liquid, said recess diminishing in the vicinity of said ignition port so that the liquid is moved radially inwardly in said passages to compress the gas, and means to ignite through said ignition port the gas which burns in a combustion area, said housing having a jet nozzle communicating with said combustion area and leading outside of said housing so that the liquid is propelled from said housing as a jet by expansion of the combustion gases, said vanes and said housing in the vicinity of said jet nozzle having a configuration so that the resultant force of combustion drives said impeller, said exhaust port being located so that the exhaust gases are forced therethrough.

2. A rotary internal combustion engine for propelling a liquid jet which comprises a housing, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a liquid inlet port, a combustible gas inlet port, an ignition port, and an exhaust gas port positioned along the path of rotation of said impeller to communicate successively with said passages as they pass said ports, said gas inlet, ignition and liquid inlet ports being in said hub directed toward the radially inside portions of said passages, means to supply combustion gas through said gas inlet port, said housing forming a neck close to the radially outer edge of said impeller between said liquid inlet and gas inlet ports and being recessed from said impeller to define a space radially outside of said passages extending circumferentially from said gas inlet port past said ignition port so that liquid introduced into said liquid inlet port is carried in said passages through said neck and a portion of the liquid is moved by centrifugal force into said space to permit combustion gas to egress from said gas inlet port into the passages radially inside of the liquid, said recess diminishing in the vicinity of said ignition port so that the liquid is moved radially inwardly in said passages to compress the gas, and means to ignite through said ignition port the gas which burns in a combustion area, said housing having a jet nozzle communicating with said combustion area and leading outside of said housing so that the liquid is propelled from said housing as a jet by expansion of the combustion gases, said vanes and said housing in the vicinity of said jet nozzle having a configuration so that the resultant force of combustion drives said impeller, said exhaust port being located radially outside of said housing opposite said liquid inlet so that liquid from said inlet is centrifugally moved outwardly in said passages to force the exhaust gases radially outwardly toward said exhaust port.

3. A rotary internal combustion engine for propelling a liquid jet which comprises a housing, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a liquid inlet port, a combustible gas inlet port, an ignition port, and an exhaust gas port positioned along the path of rotation of said impeller to communicate successively with said passages as they pass said ports, said gas inlet, ignition and liquid inlet ports being in said hub directed toward the radially inside portions of said passages, pump means operated by said impeller to force liquid through said inlet port, means to supply combustion gas through said gas inlet port, said housing forming a neck close to the radially outer edge of said impeller between said liquid inlet and gas inlet ports and being recessed from said impeller to define a space radially outside of said passages extending circumferentially from said gas inlet port past said ignition port so that liquid introduced into said liquid inlet port is carried in said passages through said neck and a portion of the liquid is moved by centrifugal force into said space to permit combustion gas to egress from said gas inlet port into the passages radially inside of the liquid, said recess diminishing in the vicinity of said ignition port so that the liquid is moved radially inwardly in said passages to compress the gas, and means to ignite through said ignition port the gas which burns in a combustion area, said housing having a jet nozzle communicating with said combustion area and leading outside of said housing so that the liquid is propelled from said housing as a jet by expansion of the combustion gases, said vanes and said housing in the vicinity of said jet nozzle having a configuration so that the resultant force of combustion drives said impeller, said exhaust port being located radially outside of said housing opposite said liquid inlet so that liquid from said inlet is centrifugally moved outwardly in said passages to force the exhaust gases radially outwardly toward said exhaust port.

4. An apparatus as recited in claim 3 wherein said hub is hollow and said pump means comprises a centrifugal pump mounted in said hub and fixed to said impeller.

5. A rotary internal combustion engine for propelling a water jet to supply power for a boat which comprises a housing adapted to be mounted on a boat, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a water inlet port, a combustible gas inlet port, an ignition port, and an exhaust gas port positioned along the path of rotation of said impeller to communicate successively with said passages as they pass said ports, means to extend below the water line of the boat to obtain and conduct water to said water inlet port, said gas inlet and ignition ports being directed toward the radially inside portion of said passages, means to supply combustion gas through said gas inlet port, said housing forming a neck close to the radially outer edge of said impeller between said water inlet and gas inlet ports and being recessed from said impeller to define a space radially outside of said passages extending circumferentially from said gas inlet port past said ignition port so that water introduced into said water inlet port is carried in said passages through said neck and a portion of the water is moved by centrifugal force into said space to permit combustion gas to egress from said gas inlet port into the passages radially inside of the water, said recess diminishing in the vicinity of said ignition port so that the water is moved radially inwardly in said passages to compress the gas, and means to ignite through said ignition port the gas which burns in a combustion area, said housing having a jet nozzle communicating with said combustion area and leading outside of said housing so that the water is propelled from said housing as a jet by expansion of the combustion gases to provide energy for propulsion of the boat, said vanes and said housing in the vicinity of said jet nozzle having a configuration so that the resultant force of combustion drives said impeller, said exhaust port being located so that the exhaust gases are forced therethrough.

6. A rotary internal combustion engine for propelling a water jet to supply power for a boat which comprises a housing adapted to be mounted on a boat, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a water inlet port, a combustible gas inlet port, an ignition port, and an exhaust gas port positioned along the path of rotation of said impeller to communicate successively with said passages as they pass said ports, means to extend below the water line of the boat to obtain and conduct water to said water inlet port, said gas inlet, ignition and water inlet ports being in said hub directed toward the radially inside portions of said passages, means to supply combustion gas through said gas inlet port, said housing forming a neck close to the radially outer edge of said impeller between said water inlet and gas inlet ports and being recessed from said impeller to define a space radially outside of said passages extending circumferentially from said gas inlet port past said ignition port so that water introduced into said water inlet port is carried in said passages through said neck and a portion of the water is moved by centrifugal force into said space to permit combustion gas to egress from said gas inlet port into the passages radially inside of the water, said recess diminishing in the vicinity of said ignition port so that the water is moved radially inwardly in said passages to compress the gas, and means to ignite through said ignition port the gas which burns in a combustion area, said housing having having a jet nozzle communicating with said combustion area and leading outside of said housing so that the water is propelled from said housing as a jet by expansion of the combustion gases to provide energy for propulsion of the boat, said vanes and said housing in the vicinity of said jet nozzle having a configuration so that the resultant force of combustion drives said impeller, said exhaust port being located radially outside of said housing opposite said water inlet so that water from said inlet is centrifugally moved outwardly in said passages to force the exhaust gases radially outwardly toward said exhaust port.

7. A rotary internal combustion engine for propelling a water jet to supply power for a boat which comprises a housing adapted to be mounted on a boat, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a water inlet port, a combustible gas inlet port, an ignition port, and an exhaust gas port positioned along the path of rotation of said impeller to communicate successively with said passages as they pass said ports, said gas inlet, ignition and water inlet ports being in said hub directed toward the radially inside portions of said passages, pump means operated by said impeller to force water through said water inlet port, a conduit extending from said pump means to below the water line of the boat to obtain water for said pump means, means to supply combustion gas through said gas inlet port, said housing forming a neck close to the radially outer edge of said impeller between said water inlet and gas inlet ports and being recessed from said impeller to define a space radially outside of said passages extending circumferentially from said gas inlet port past said ignition port so that water introduced into said water inlet port is carried in said passages through said neck and a portion of the water is moved by centrifugal force into said space to permit combustion gas to egress from said gas inlet port into the passages radially inside of the water, said recess diminishing in the vicinity of said ignition port so that the water is moved radially inwardly in said passages to compress the gas, and means to ignite through said ignition port the gas which burns in a combustion area, said housing having a jet nozzle communicating with said combustion area and leading outside of said housing so that the water is propelled from said housing as a jet by expansion of the combustion gases to provide energy for propulsion of the boat, said vanes and said housing in the vicinity of said jet nozzle having a configuration so that the resultant force of combustion drives said impeller, said exhaust part being located so that the exhaust gases are forced therethrough.

8. An apparatus as recited in claim 7 wherein the outer end of said conduit forms a water scoop directed into the path of movement of the boat.

9. A rotary internal combustion engine for propelling a water jet to supply power for a boat which comprises a housing adapted to be mounted on a boat, a turbine impeller rotatably mounted in said housing and having a plurality of curved shrouded vanes defining therebetween a plurality of generally radial passages through said impeller, said impeller having inside of said vanes a hollow hub normally blocking the inside of said passages, means defining a water inlet port, a combustible gas inlet port, an ignition port and an exhaust gas port positioned along the path of rotation of said impeller to communicate successively with said passages as they pass said ports, said gas inlet, ignition and water inlet ports being in said hub directed toward the radially inside portions of said passages, a centrifugal pump mounted in said hollow hub and fixed to said impeller to be rotated thereby to force water through said water inlet port, a conduit extending from said pump to below the water line of the boat to obtain water for said pump, means to supply combustion gas through said gas inlet port, said housing forming a neck close to the radially outer edge of said impeller between said water inlet and gas inlet ports and being recessed from said impeller to define a space radially outside of said passages extending circumferentially from said gas inlet port past said ignition port so that water introduced into said water inlet port is carried in said passages through said neck and a portion of the water is moved by centrifugal force into said space to permit combustion gas to egress from said gas inlet port into the passages radially inside of the water, said recess diminishing in the vicinity of said ignition port so that the water is moved radially inwardly in said passages to compress the gas, and means to ignite through said ignition port the gas which burns in a combustion area, said housing having a jet nozzle communicating with said combustion area and leading outside of said housing so that the water is propelled from said housing as a jet by expansion of the combustion gases to provide energy for propulsion of the boat, said vanes and said housing in the vicinity of said jet nozzle having a configuration so that the resultant force of combustion drives said impeller, said exhaust port being located radially outside of said housing opposite said water inlet so that water from said inlet is centrifugally moved outwardly in said passages to force the exhaust gases radially outwardly toward said exhaust port.

10. An apparatus as recited in claim 9 wherein the outer end of said conduit forms a water scoop directed into the path of movement of the boat.

11. A rotary internal combustion engine for propelling a liquid jet which comprises a housing, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a liquid inlet port, a combustible gas inlet port, an ignition port and an exhaust gas port positioned along the path of rotation of said impeller to communicate successively with said passages as they pass said ports, said gas inlet and ignition ports being directed toward the radially inside portion of said passages, means to supply combustion gas through said gas inlet port, said housing forming a neck close to the radially outer edge of said impeller between said liquid inlet and gas inlet ports and being recessed from said impeller to define a space radially outside of said passages extending circumferentially from said gas inlet port past said ignition port so that liquid introduced into said liquid inlet port is carried in said passages through said neck and a portion of the liquid is moved by centrifugal force into said space to permit combustion gas to egress from said gas inlet port into the passages radially inside of the liquid, said recess diminishing in the vicinity of said ignition port so that the liquid is moved radially inwardly in said passages to compress the gas, and means to ignite through said ignition port the gas which burns in a combustion area, said housing having a jet nozzle radially outside of said impeller in communication with said combustion area and leading outside of said housing so that the liquid is propelled from said housing as a jet by centrifugal force and radially outward expansion of the combustion gases, said vanes and said housing in the vicinity of said jet nozzle having a configuration so that the resultant force of combustion drives said impeller, said exhaust port being located so that the exhaust gases are forced therethrough.

12. A rotary internal combustion engine for propelling a liquid jet which comprises a housing, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a liquid inlet port, a combustible gas inlet port, an ignition port and an exhaust gas port positioned along the path of rotation of said impeller to communicate successively with said passages as they pass said ports, said gas inlet, ignition and liquid inlet ports being in said hub directed toward the radially inside portion of said passages, means to supply combustion gas through said gas inlet port, said housing forming a neck close to the radially outer edge of said impeller between said liquid inlet and gas inlet ports and being recessed from said impeller to define a space radially outside of said passages extending circumferentially from said gas inlet port past said ignition port so that liquid introduced into said liquid inlet port is carried in said passages through said neck and a portion of the liquid is moved by centrifugal force into said space to permit combustion gas to egress from said gas inlet port into the passages radially inside of the liquid, said recess diminishing in the vicinity of said ignition port so that the liquid is moved radially inwardly in said passages to compress the gas, and means to ignite through said ignition port the gas which burns in a combustion area, said housing having a jet nozzle radially outside of said impeller in communication with said combustion area and leading outside of said housing so that the liquid is propelled from said housing as a jet by centrifugal force and radially outward expansion of the combustion gases, said vanes and said housing in the vicinity of said jet outlet having a configuration so that the resultant force of combustion drives said impeller, said exhaust port being located radially outside of said housing opposite said liquid inlet so that liquid from said inlet is centrifugally moved outwardly in said passages to force the exhaust gases radially outwardly toward said exhaust port.

13. A rotary internal combustion engine for propelling a water jet to supply power for a boat which comprises a housing adapted to be mounted on a boat, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a water inlet port, a combustible gas inlet port, an ignition port, and an exhaust gas port positioned along the path of rotation of said impeller to communicate successively with said passages as they pass said ports, means to extend below the water line of the boat to obtain and conduct water to said water inlet port, said gas inlet and ignition ports being directed toward the radially inside portion of said passages, means to supply combustion gas through said gas inlet port, said housing forming a neck close to the radially outer edge of said impeller between said water inlet and gas inlet ports and being recessed from said impeller to define a space radially outside of said passages extending circumferentially from said gas inlet port past said ignition port so that water introduced into said water inlet port is carried in said passages through said neck and a portion of the water is moved by centrifugal force into said space to permit combustion gas to egress from said gas inlet port into the passages radially inside of the water, said recess diminishing in the vicinity of said igniton port so that the water is moved radially inwardly in said passages to compress the gas, and means to ignite through said ignition port the gas which burns in a combustion area, said housing having a jet nozzle radially outside of said impeller in communication with said combustion area and leading outside of said housing so that the water is propelled from said housing as a jet by centrifugal force and radially outward expansion of the combustion gases, said vanes and said housing in the vicinity of said jet outlet having a configuration so that the resultant force of combustion drives said impeller, said exhaust port being located so that the exhaust gases are forced therethrough.

14. A rotary internal combustion engine for propelling a water jet to supply power for a boat which comprises a housing adapted to be mounted on a boat, a turbine impeller rotatably mounted in said housing and having a plurality of curved shrouded vanes defining therebetween a plurality of generally radial passages through said impeller, said impeller having inside of said vanes a hub normally blocking the inside of said passages, means defining a water inlet port, a combustible gas inlet port, an ignition port, and an exhaust gas port positioned along the path of rotation of said impeller to communicate successively with said passages as they pass said ports, means to extend below the water line of the boat to obtain and conduct water to said water inlet port, said gas inlet, ignition and water inlet ports being in said hub directed toward the radially inside portions of said passages, means to supply combustion gas through said gas inlet port, said housing forming a neck close to the radially outer edge of said impeller between said water inlet and gas inlet ports and being recessed from said impeller to define a space radially outside of said passages extending circumferentially from said gas inlet port past said ignition port so that water introduced into said water inlet port is carried in said passages through said neck and a portion of the water is moved by centrifugal force into said space to permit combustion gas to egress from said gas inlet port into the passages radially inside of the water, said recess diminishing in the vicinity of said igntion port so that the water is moved radially inwardly in said passages to compress the gas, and means, to ignite through said ignition port the gas which burns in a combustion area, said housing having a jet nozzle radially outside of said impeller in communication with said combustion area and leading outside of said housing so that the water is propelled from said housing as a jet by centrifugal force and radially outward expansion of the combustion gases, said vanes and said housing in the vicinity of said jet outlet having a configuration so that the resultant force of combustion drives said impeller, said exhaust port being located radially outside of said housing opposite said water inlet so that water from said inlet is centrifugally moved outwardly in said passages to force the exhaust gases radially outwardly toward said exhaust port.

15. A rotary internal combustion engine for propelling a water jet to supply power for a boat which comprises a housing adapted to be mounted on a boat, a turbine impeller rotatably mounted in said housing and having a plurality of curved shrouded vanes defining therebetween a plurality of generally radial passages through said impeller, said impeller having inside of said vanes a hollow hub normally blocking the inside of said passages, means defining a water inlet port, a combustible gas inlet port, an ignition port, and an exhaust gas port positioned along the path of rotation of said impeller to communicate successively with said passages as they pass said ports, said gas inlet, ignition and water inlet ports being in said hub directed toward the radially inside portions of said passages, a centrifugal pump mounted in said hollow hub and fixed to said impeller to be rotated thereby to force water through said water inlet port, a conduit extending from said pump to below the water line of the boat to obtain water for said pump, means to supply combustion gas through said gas inlet port, said housing forming a neck close to the radially outer edge of said impeller between said water inlet and gas inlet ports and being recessed from said impeller to define a space radially outside of said passages extending circumferentially from said gas inlet port past said ignition port so that water introduced into said water inlet port is carried in said passages through said neck and a portion of the water is moved by centrifugal force into said space to permit combustion gas to egress from said gas inlet port into the passages radially inside of the water, said recess diminishing in the vicinity of said igniton port so that the water is moved radially inwardly in said passages to compress the gas, and means to ignite through said ignition port the gas which burns in a combustion area, said housing having a jet nozzle radially outside of said impeller in communication with said combustion area and leading outside of said housing so that the water is propelled from said housing as a jet by centrifugal force and radially outward expansion of the combustion gases, said vanes and said housing in the vicinity of said jet outlet having a configuration so that the resultant force of combustion drives said impeller, said exhaust port being located radially outside of said housing opposite said water inlet so that water from said inlet is centrifugally moved outwardly in said passages to force the exhaust gases radially outwardly toward said exhaust port.

16. An apparatus as recited in claim 15 wherein the outer end of said conduit forms a water scoop directed into the path of movement of the boat.

No references cited.